US010914886B2

United States Patent
Rao et al.

(10) Patent No.: US 10,914,886 B2
(45) Date of Patent: Feb. 9, 2021

(54) QUANTUM DOT ENHANCEMENT FILM AND MANUFACTURING METHOD THEREOF, QUANTUM DOT BACKLIGHT MODULE AND DISPLAY DEVICE

(71) Applicant: Shenzhen China Star Optoelectronics Technology Co., Ltd., Shenzhen (CN)

(72) Inventors: Sudi Rao, Shenzhen (CN); Min Tang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 306 days.

(21) Appl. No.: 16/109,817

(22) Filed: Aug. 23, 2018

(65) Prior Publication Data

US 2019/0243050 A1    Aug. 8, 2019

Related U.S. Application Data

(63) Continuation of application No. PCT/CN2018/079567, filed on Mar. 20, 2018.

(30) Foreign Application Priority Data

Feb. 8, 2018    (CN) .......................... 2018 1 0132966

(51) Int. Cl.
*F21V 8/00*    (2006.01)
*C09K 11/02*    (2006.01)
(Continued)

(52) U.S. Cl.
CPC .............. *G02B 6/005* (2013.01); *C09K 11/02* (2013.01); *C09K 11/665* (2013.01); *G02F 2001/133614* (2013.01)

(58) Field of Classification Search
CPC ...... C09K 11/02; C09K 11/665; G02B 5/005; G02F 2001/133614
See application file for complete search history.

(56) References Cited

U.S. PATENT DOCUMENTS

2017/0355745 A1    12/2017    Juang et al.

FOREIGN PATENT DOCUMENTS

| CN | 103525398 | * | 1/2014 |
| CN | 103525398 A | | 1/2014 |

(Continued)

OTHER PUBLICATIONS

The First Office Action for related Chinese Application No. 201810132966.9 dated Dec. 4, 2019;(6 pages).

*Primary Examiner* — C Melissa Koslow

(57) ABSTRACT

The present disclosure discloses a quantum dot enhancement film and a manufacturing method thereof, as well as a quantum dot backlight module and a display device. The quantum dot enhancement film includes an optical film, a perovskite quantum sphere molecule which is coated on an optical film and includes a nano-scale spheres doped with perovskite quantum dots, perovskite quantum dots are combined through a chemical bond and doped on a surface of the nano-scale spheres. By the above means, the stability of the quantum dot enhancement film is enhanced. In addition, the quantum dot enhancement film adopting the perovskite quantum sphere has high quantum efficiencies and color gamut, greatly improving the display effect.

19 Claims, 3 Drawing Sheets

(51) Int. Cl.
*C09K 11/66* (2006.01)
*G02F 1/13357* (2006.01)

(56) References Cited

FOREIGN PATENT DOCUMENTS

| | | |
|---|---|---|
| CN | 104338089 A | 3/2015 |
| CN | 105720205 A | 3/2016 |
| CN | 105789339 A | 7/2016 |
| CN | 106830060 A | 6/2017 |
| CN | 106910814 A | 6/2017 |
| CN | 107099290 A | 8/2017 |
| CN | 107508128 A | 1/2018 |
| KR | 101666309 B1 | 10/2016 |

\* cited by examiner

QUANTUM DOT ENHANCEMENT FILM AND MANUFACTURING METHOD THEREOF, QUANTUM DOT BACKLIGHT MODULE AND DISPLAY DEVICE

CROSS-REFERENCE TO RELATED APPLICATIONS

The present application is a continuation-application of International (PCT) Patent Application No. PCT/CN2018/079567 filed Mar. 20, 2018, which claims foreign priority of Chinese Patent Application No. 201810132966.9, filed on Feb. 8, 2018 in the State Intellectual Property Office of China, the entire contents of which are hereby incorporated by reference.

TECHNICAL FIELD

The present disclosure generally relates to a field of display technology, and in particular to a quantum dot enhancement film and a manufacturing method thereof, as well as a quantum dot backlight module and a display device.

BACKGROUND

With the continuous development of displayer industry technology, people have become increasingly demanding of a higher quality of the displayer, including the display requirements for the color effect of the displayer. Therefore, a light-emitting diode (LED) backlight, as a key direction to enhance the color gamut of the display, is also constantly developing. Quantum dot LED backlight is a major focus of the displayer industry to enhance color gamut. In the conventional quantum dot LED backlight, in Groups II-VI cadmium selenide (CdSe)-based quantum dots are commonly used, with a core-shell structure, and thus a key problem is that the manufacturing process is relatively complicated, and the manufacturing cost is high.

As a solution processible semiconductor material, the perovskite quantum dot material has characteristics of a low cost, an adjustable wavelength, a narrow photoluminescence spectrum and the like, involving a great potential for being applied in the field of electroluminescence and display. Therefore, applying the perovskite quantum dots to the backlight can not only improve the displayer quality but also reduce the manufacturing cost. However, currently the perovskite quantum dots, no matter the organic-inorganic hybrid perovskite quantum dots or the fully inorganic perovskite quantum dots, are subject to the weakness in thermal stability, water vapor resistance stability, and light resistance stability, and therefore are difficult to be applied in the display.

SUMMARY

The technical problem to be solved by the present disclosure is to provide a quantum dot enhancement film and a manufacturing method thereof, as well as a quantum dot backlight module and a display device, wherein a perovskite quantum sphere molecule is used, and perovskite quantum dots are combined through a chemical bond and doped to a surface of the nano-scale sphere, so as to enhance the stability of the quantum dot enhancement film.

To solve the above problems, the present disclosure provides a quantum dot enhancement film, including an optical film; and a perovskite quantum sphere molecule coated on the optical film, including a nano-scale sphere doped with a perovskite quantum dot, with the perovskite quantum dot combined through the chemical bond and doped on a surface of the nano-scale sphere.

In order to solve the above problems, the present disclosure also provides a quantum dot backlight module. The quantum dot backlight module includes the quantum dot enhancement film. The quantum dot enhancement film includes an optical film; and a perovskite quantum sphere molecule coated on the optical film, including a nano-scale sphere doped with a perovskite quantum dot, with the perovskite quantum dot combined through the chemical bond and doped on a surface of the nano-scale sphere.

To solve the above problem, the present disclosure further provides a display device including the above quantum dot backlight module. The quantum dot backlight module includes a quantum dot enhancement film, and the quantum dot enhancement film includes an optical film; and a perovskite quantum sphere molecule coated on the optical film, including a nano-scale sphere doped with a perovskite quantum dot, with the perovskite quantum dot combined through the chemical bond and doped on a surface of the nano-scale sphere.

In order to solve the above problems, the present disclosure also provides a method for manufacturing a quantum dot enhancement film, which includes the steps of: adding a nano-scale sphere to a mixed solution of synthetic perovskite quantum dots to obtain a reaction liquid; performing a preset treatment on the reaction liquid to enable the perovskite quantum dots to be combined through the chemical bond and doped on a surface of the nano-scale sphere after the reaction are completed; and coating the reaction liquid having been processed by the preset treatment, on an optical film, and drying the optical film after coating.

The beneficial effect of the present disclosure lies in that: differing from the prior art, the quantum dot enhancement film provided by the present disclosure using a perovskite quantum sphere molecule, and the perovskite quantum sphere molecule includes a nano-scale sphere doped with a perovskite quantum dot. The perovskite quantum dots are combined by the chemical bond and doped on the surface of the nano-scale sphere. In this way, the stability of the quantum dot enhancement film is enhanced. In addition, the quantum dot enhancement film using the perovskite quantum sphere molecule has high quantum efficiencies and color gamut, which greatly improves the display effect.

DETAILED DESCRIPTION

In order to more clearly illustrate the objective, technical solutions and beneficial effects of the present disclosure, the technical solutions in the embodiments of the present disclosure will now be described clearly and completely with reference to the accompanying drawings in embodiments. Obviously, the described embodiments are only a part of the embodiments of the present disclosure, not all of the embodiments. All other embodiments obtained by one with ordinary skills in the art based on the embodiments of the present disclosure without creative efforts shall fall into the protection scope of the present disclosure.

Figure 1:
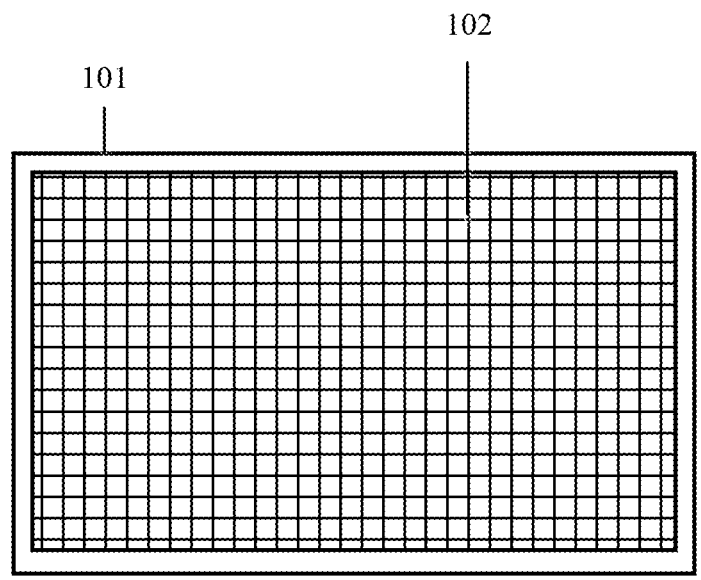
FIG. 1 is a schematic structural diagram of an embodiment of a quantum dot enhancement film of the present disclosure.
Figure 2:
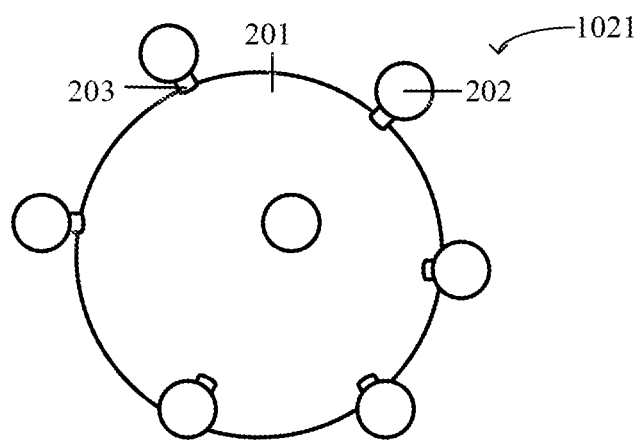
FIG. 2 is a schematic structural diagram of a perovskite quantum sphere molecule in FIG. 1.
Figure 3:
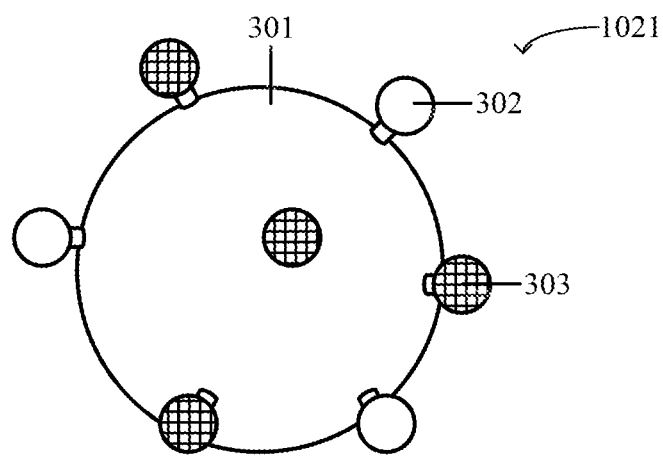
FIG. 3 is a schematic structural diagram of another embodiment of the perovskite quantum sphere molecule in FIG. 1.

Referring to FIG. 1 to FIG. 3, FIG. 1 is a schematic structural diagram of an embodiment of a quantum dot enhancement film of the present disclosure. The quantum dot enhancement film includes an optical film 101 and a coating layer 102 including a perovskite quantum sphere molecule 1021. Herein, the perovskite quantum sphere molecule 1021 is attached to the optical film 101 that is coated with the perovskite quantum sphere molecule 1021.

Referring to FIG. 2, FIG. 2 is a schematic diagram of the structure of the perovskite quantum sphere molecule in FIG. 1. The Perovskite quantum sphere molecule 1021 includes a nano-scale sphere 201 doped with a perovskite quantum dot 202. Combined through a chemical bond 203, the perovskite quantum dots 202 are doped on a surface of the nano-scale sphere 201. Since the perovskite quantum dots 202 are uniformly dispersed on the surface-treated nano-scale sphere 201, perovskite quantum dots 202 on the same nano-scale sphere 201 are not easy to get together. And the volume of the nano-scale sphere 201 is much larger than the volume of the perovskite quantum dots 202, perovskite quantum dots 202 on different nano-scale sphere 201 are not easy to gather together, therefore the quantum dot enhancement film formed in this case is not easy to aggregate or the like, and can still well maintain its original state in the case of water vapor, light, and heat, therefore having a good stability. Typically, a composition of the nano-scale sphere 201 comprises at least one of $SiO_2$, $TiO_2$, and organic light emitting material. The composition of the nano-scale sphere 201 may further comprise plasma. Herein, plasma is an ionized gas substance composed of positive and negative ions generated by ionization of atoms and atomic groups after partial electrons are deprived.

perovskite quantum dots 202 are combined via the chemical bond 203 to the nano-scale spheres 201, and perovskite quantum dots 202 uniformly dispersed on a nano-scale sphere 201 having been processed with a surface treatment. The surface treatment comprises at least one of an amination treatment, an esterification treatment, and an acidification treatment. The surface-treated nano-scale sphere 201 greatly enhances the bonding ability with the perovskite quantum dots 202, and enhances the stability of the perovskite quantum sphere molecules 1021 formed by the perovskite quantum dots 202 and the nano-scale sphere 201.

The perovskite quantum dots dispersed on the nano-scale sphere may be perovskite quantum dots of the light with the same color, or may be perovskite quantum dots of lights in two different kinds of colors. Further referring to FIG. 3, FIG. 3 is a schematic diagram of another embodiment of the perovskite quantum sphere molecule in FIG. 1. The perovskite quantum dots doped on the nano-scale spheres 301 are classified into two types of perovskite quantum dots, namely a green light perovskite quantum dot 302 and a red light perovskite quantum dot 303. When an external blue LED is used as a light source, the green light perovskite quantum dot 302 and the red light perovskite quantum dot 303 are excited to obtain a white light backlight. After the green light perovskite quantum dot 302 and the red light perovskite quantum dot 303 are irradiated by the light source, as the wavelengths of light absorbed by the green perovskite quantum dot 302 and the red light perovskite quantum dot 303 are smaller than the wavelength of their own self-emitting light, the perovskite quantum dot 302 or 303 of one color may absorb the light emitted by the perovskite quantum dot 303 or 302 of another color, which may easily cause a light loss inside the perovskite quantum dot 302 or 303, thus reducing the quantum efficiency. In this embodiment, since the green light perovskite quantum dots 302 and the red light perovskite quantum dots 303 are combined by chemical bonds and doped on the surface of the nano-scale sphere 301, the uniformity and consistency of the perovskite quantum dots 302 and 303 are increased. When the green light perovskite quantum dot 302 and the red light perovskite quantum dot 303 are irradiated by the light source, the effect of light absorption between the green light perovskite quantum dot 302 and the red light perovskite quantum dot 303 is reduced, thus improving the quantum efficiency of perovskite quantum dot film.

It should be noted that, the color of the perovskite quantum dot doped on the surface of the nano-scale sphere by chemical bonding, comprises at least one of a green perovskite quantum dot, a red perovskite quantum dot, and a blue perovskite quantum dot, which is not limited herein.

In this embodiment, perovskite quantum dots can be classified into organic and inorganic hybrid perovskite quantum dots and fully inorganic perovskite quantum dots. The organic and inorganic hybrid perovskite quantum dots have a chemical formula of $RNH_3MX_3$, $RNH_3^+$ is an aliphatic linear cation, M is a metal element of Group IV, such as Pb, Sn, and Ge, and X is a halogen element, such as Cl, Br, and I. A chemical formula of the fully inorganic perovskite quantum dot is $CsMX_3$, M is a metal element of Group IV, such as Pb, Sn, and Ge, and X is a halogen element, such as Cl, Br, and I.

Differing from the prior art, the quantum dot enhancement film provided by the present embodiment adopts a perovskite quantum sphere molecule. The perovskite quantum sphere molecule includes a nano-scale sphere doped with a perovskite quantum dot, and the perovskite quantum dot is doped on the surface of nano-scale sphere through chemical bonding. By the above means, the stability of the quantum dot enhancement film is enhanced. In addition, the quantum dot enhancement film using perovskite quantum spheres has high quantum efficiencies and color gamut, which greatly improves the display effect.

Figure 4:
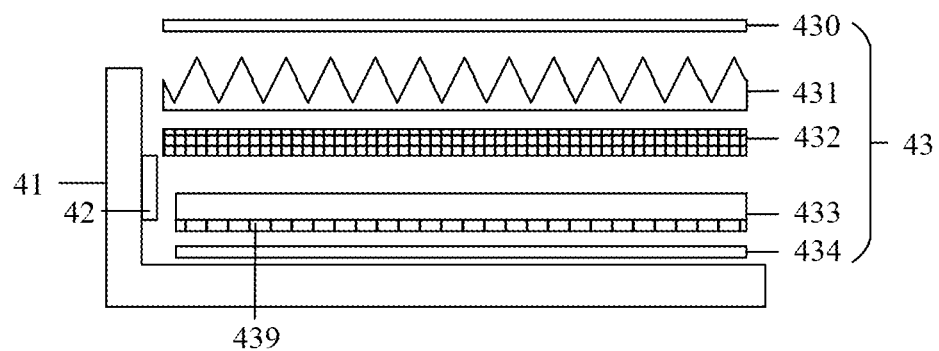
FIG. 4 is a schematic structural diagram of a quantum dot backlight module according to an embodiment of the present disclosure.

Referring to FIG. 4. FIG. 4 is a schematic structural diagram of a quantum dot backlight module according to an embodiment of the present disclosure. The main structure of the quantum dot backlight module includes a module frame 41, an optical component 43 and a light source 42. The optical component 43 includes a diffusion sheet 430, a prism sheet 431, a quantum dot enhancement film 432, and a light guide sheet 433 and a reflection sheet 434, arranged from top to bottom. The light source 42 is disposed in the module frame 41 next to the light guide sheet 433. A plurality of dimming dots 439 are disposed on a lower side of the light guide sheet 33. Also, the quantum dot enhancement film 432 may be the quantum dot enhancement film in the above embodiment.

In this embodiment, after the light source 42 is turned on, the light dimming dots 439 on the light guide sheet 433 adjust the light is to adjust the reflection strength of the light. A part of the adjusted light passes through the quantum dot enhancement film 432, the prism sheet 431, and the diffusion sheet 430 in sequence, to get emitted upward. A part of the light passes to reach to the reflection sheet 434 on the bottom, and then passes through the light guide sheet 433, the quantum dot enhancement film 432, the prism sheet 431, and the diffusion sheet 430 in sequence to get emitted outward. When the light irradiates the quantum dot enhancement film 432, the perovskite quantum dot on the quantum dot enhancement film 432 is irradiated with light, and the half width of the photoluminescence spectrum is narrow to be about 25 nm, which greatly improves the color gamut of the quantum dot enhancement film 432, and by doping perovskite quantum dots on the surface of nano-scale sphere, the influence between perovskite quantum dots is avoided and quantum efficiency is greatly improved. In addition, since the perovskite quantum dots are uniformly dispersed on the surface-treated nano-scale sphere, the quantum dot enhancement membranes formed in this way is not easy to aggregate or the like, and it may well maintain the original state in the case of water vapor, light, and heat, thus having a good stability. For a specific structure of the quantum dot enhancement film 432, reference may be made to any of the above embodiments in FIGS. 1-3, and details are not described herein again.

Different from the prior art, a quantum dot backlight module provided in this embodiment adopts the above quantum dot enhancement film, so the quantum dot backlight module has high quantum efficiencies and color gamut, and greatly improves the display effect.

Figure 5:
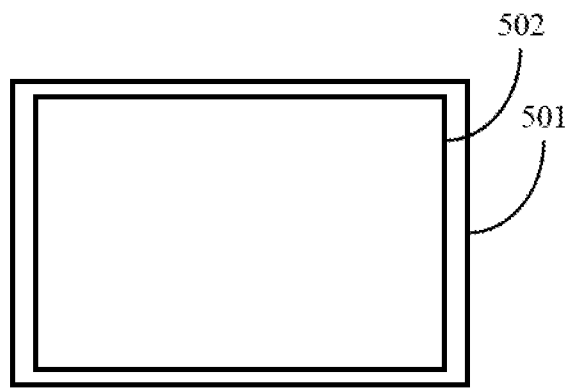
FIG. 5 is a schematic structural diagram of an embodiment of a display device according to the present disclosure.

In addition, the present disclosure further provides a display device. As shown in FIG. 5, FIG. 5 is a schematic structural diagram of an embodiment of a display device according to the present disclosure. The display device 501 includes the above mentioned quantum dot backlight module 502. Since the quantum dot backlight module 502 is adopted, the display device 501 has high quantum efficiencies and color gamut, which greatly improves the display effect.

Figure 6:
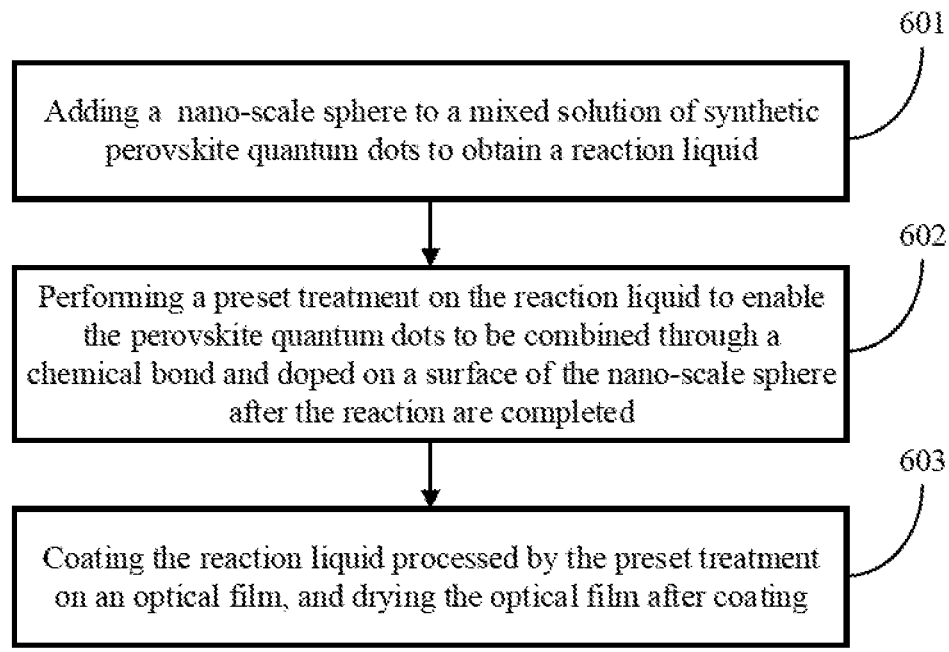
FIG. 6 is a schematic flowchart of an embodiment of a manufacturing method of a quantum dot enhancement film according to the present disclosure.

Referring to FIG. 6, FIG. 6 is a schematic flowchart of an embodiment of a method for manufacturing a quantum dot enhancement film according to the present disclosure, which includes the following steps.

In step 601, the method includes adding a nano-scale sphere to a mixed solution of synthetic perovskite quantum dots to obtain a for reaction liquid.

In this embodiment, in order to enhance the binding ability between the perovskite quantum dots and the spheres, the nano-scale spheres need to be pre-processed with an amination treatment, an esterification treatment, or an acidification treatment.

It should be noted that the mixed solution of the synthetic perovskite quantum dots does not mean that the perovskite quantum dots have been synthesized at this time, but is only a mixed solution of the perovskite quantum dots to be synthesized, and in this embodiment, the perovskite quantum dots to be synthesized are one of organic and inorganic hybrid perovskite quantum dots or fully inorganic perovskite quantum dots.

In step 602, the method includes performing a preset treatment on the reaction liquid to enable the perovskite quantum dots to be combined through the chemical bond and doped on the surface of the nano-scale sphere after the reaction are completed.

In this embodiment, after the nano-scale spheres having been processed by the preset treatment are added to the mixed solution of the synthetic perovskite quantum dots to obtain the reaction liquid, the reaction liquid is sequentially dissolved, heated, centrifuged, and washed to obtain a solution containing perovskite quantum spheres molecule, the perovskite quantum sphere molecule including nano-scale spheres doped with perovskite quantum dots. Since perovskite quantum dots are combined through the chemical bond and doped on the surface of nano-scale sphere, the perovskite quantum dots formed in this case are not easy to aggregate, and they can well maintain the original state in the case of water vapor, light, and heat, thus having a good stability.

In step 603, the method includes coating the reaction liquid processed by the preset treatment, on an optical film, and drying the optical film after coating.

After the solution containing the perovskite quantum sphere molecule is obtained by the above-mentioned preset treatment, the reaction liquid having been processed by the preset treatment is coated on the optical film for drying, and thereby a quantum dot enhancement film is obtained. When the perovskite quantum dot in the quantum dot enhancement film is irradiated with light, the half width of the photoluminescence spectrum is narrow to be about 25 nm, which greatly enhances the color gamut of the quantum dot enhancement film, and by doping the perovskite quantum dots on the surface of the nano-scale sphere, the influence between the perovskite quantum dots is avoided and the quantum efficiency is greatly improved.

In a specific embodiment, the specific description is made on synthesizing a fully inorganic perovskite quantum dot enhancing film that can excite light in two colors of red and green. Silica spheres are chosen to work as a nano-scale sphere material. The amination treatment is performed first, and specifically, the silica spheres, ethanol, and triethyloxysilane are mixed in a certain ratio and centrifuged. After the amination treatment is completed, the aminated silica spheres are added to the mixed solution of the synthetic perovskite quantum dots, and the silica spheres are mixed with, $Cs_2CO_3$, $PbBr_2$, and $PbI_2$ in a molar ratio of 2:1:1, in a solution of dimethylamine, dimethyl sulfoxide or octadecene, a small amount of a surfactant such as oleic acid and oleamide is added, and the mixture is enable to react under continuous stirring and heating. After the reaction completed, a product is obtained through a centrifugation treatment, and then the product is washed with a toluene solution to obtain a fully inorganic perovskite quantum sphere molecule solution with a molecular formula of $CsPbBr_3$—$SiO_2$/$CsPbI_3$—$SiO_2$. Then, the above obtained perovskite quantum sphere molecule solution is dispersed in a toluene solution, and is disposed on a pre-cleaned optical film by spin coating, wherein the optical film may be selected from materials commonly used for the barrier film of the quantum dot enhancement film. After the spin coating is completed, the film is placed in a fume hood for drying to obtain the fully inorganic perovskite quantum dot enhancement film of light in two colors of red and green.

In another embodiment, the organic and inorganic hybrid perovskite quantum dot enhancement film that can excite light of both red and green colors are specifically described. Silica spheres are chosen to work as a nano-scale sphere material. The amination treatment is performed first, and specifically, the silica spheres, ethanol, and triethyloxysilane are mixed in a certain ratio and centrifuged. After the amination treatment is completed, the aminated silica spheres are added to the mixed solution of the synthetic perovskite quantum dots, and the silica spheres are mixed with, $CH_3NH_3Br$, $CH_3NH_3I$, $PbBr_2$ and $PbI_2$ in a molar ratio of 1:1:1:1, in a solution of dimethylamine, dimethyl sulfoxide or octadecene, a small amount of a surfactant such as oleic acid and oleamide is added, and the mixture is enable to react under continuous stirring and heating. After the reaction completed, a product is obtained through a centrifugation treatment, and then the product is washed with a toluene solution to obtain a organic and inorganic hybrid perovskite quantum sphere molecule solution with a molecular formula of $CH_3NH_3PbBr_3$—$SiO_2$/$CH_3NH_3PbI_3$—$SiO_2$. Then, the above obtained perovskite quantum sphere molecule solution is dispersed in a toluene solution, and is disposed on a pre-cleaned optical film by spin coating, wherein the optical film may be selected from materials commonly used for the barrier film of the quantum dot enhancement film. After the spin coating is completed, the film is placed in a fume hood for drying to obtain the organic and inorganic hybrid perovskite quantum dot enhancement film of light in two colors of red and green.

In other embodiments, a composition of the nano-scale spheres may comprises at least one of $TiO_2$, and organic light emitting materials, which is not limited herein. The composition of the nano-scale spheres may further comprise plasma. In addition, if it is needed to increase or decrease the number of perovskite quantum dots doped on the surface of the nano-scale sphere, the amount of each component in the mixed solution of the synthetic perovskite quantum dots can be increased or decreased. At the same time, the perovskite quantum dots doped on the surface of the nano-scale spheres can also be changed according to the content of each component in the mixed solution of the synthetic perovskite quantum dots, for example, the number of the green light perovskite quantum dots on the surface of the nano-scale spheres and the red light perovskite quantum dots may be adjusted to a ratio of 1:2.

The quantum dot enhancement film obtained above can generate a white light backlight source by exciting the perovskite quantum dots of light in two colors of red and green under the irradiation of a blue LED light source. The half-maximum width of the photoluminescence spectrum of the perovskite quantum dot in the quantum dot enhancement film is only 25 nm, greatly improving the color gamut of the quantum dot enhancing film, and by doping the perovskite quantum dots on the surface of the nano-scale sphere, the influence between the perovskite quantum dots is avoided, thus greatly improving the quantum efficiency.

Differing from the prior art, the quantum dot enhancement film produced in this embodiment employs a perovskite quantum sphere molecule, and the perovskite quantum sphere molecule includes a nano-scale sphere doped with a perovskite quantum dot, and the perovskite quantum dot is combined through chemical bond and doped on the surface of nano-scale sphere. By the above means, the stability of the quantum dot enhancement film is enhanced. In addition, the quantum dot enhancement film using perovskite quantum spheres has high quantum efficiencies and color gamut, which greatly improves the display effect.

It should be noted that the nano-scale spheres in the method for manufacturing the quantum dot enhancement film and the quantum dot enhancement film provided by the embodiments of the present disclosure are not limited to the doping of the perovskite quantum dots, but also include other methods for the modification or loading of the perovskite Quantum dots.

It should be noted that the foregoing embodiments all belong to the same inventive concept. The description of each embodiment has its own emphasis. In the individual embodiments, the details are not described, and reference may be made to the description in other embodiments.

The above description merely illustrates exemplary embodiments of the disclosure, which however are not intended to limit the scope of the disclosure to these specific embodiments. Any equivalent structural or flow modifications or transformations made to the disclosure, or any direct or indirect applications of the disclosure on any other related fields, shall all fall in the scope of the disclosure.

What is claimed is:

1. A quantum dot enhancement film comprising:
an optical film; and
a perovskite quantum sphere molecule coated on the optical film, including a nano-scale sphere doped with a perovskite quantum dot, with the perovskite quantum dot combined through a chemical bond and doped on a surface of the nano-scale sphere.

2. The quantum dot enhancement film of claim 1, wherein a composition of the nano-scale sphere comprises at least one of $SiO_2$, $TiO_2$, and an organic light emitting material.

3. The quantum dot enhancement film of claim 2, wherein the composition of the nano-scale sphere further comprises a plasma.

4. The quantum dot enhancement film of claim 1, wherein the perovskite quantum dot comprises at least one of an organic and inorganic hybrid perovskite quantum dot and a fully inorganic perovskite quantum dot.

5. The quantum dot enhancement film according to claim 4, wherein the organic and inorganic hybrid perovskite quantum dots comprises a chemical formula of $RNH_3MX_3$, $RNH_3^+$ is an aliphatic linear cation and M is a metal element of Group IV, and X is a halogen element.

6. The quantum dot enhancement film of claim 4, wherein the fully inorganic perovskite quantum dot comprises a chemical formula of $CsMX_3$, M is a metal element of Group IV and X is a halogen element.

7. The quantum dot enhancement film of claim 4, wherein the nano-scale sphere is processed by at least one of an amination treatment, an esterification treatment and an acidification treatment.

8. A quantum dot backlight module comprising a quantum dot enhancement film comprising:
an optical film; and
a perovskite quantum sphere molecule coated on the optical film, including a nano-scale sphere doped with a perovskite quantum dot, with the perovskite quantum dot combined through a chemical bond and doped on a surface of the nano-scale sphere.

9. The quantum dot backlight module of claim 8, wherein a composition of the nano-scale sphere comprises at least one of $SiO_2$, $TiO_2$, and an organic light emitting material.

10. The quantum dot backlight module of claim 8, wherein the perovskite quantum dot comprises at least one of an organic and inorganic hybrid perovskite quantum dot or, and a fully inorganic perovskite quantum dot.

11. The quantum dot backlight module of claim 10, wherein the organic and inorganic hybrid perovskite quantum dots comprises a chemical formula of $RNH_3MX_3$, $RNH_3^+$ is an aliphatic linear cation and M is a metal element of Group IV, and X is a halogen element.

12. The quantum dot backlight module of claim 10, wherein the fully inorganic perovskite quantum dot comprises a chemical formula of $CsMX_3$, M is a metal element of Group IV and X is a halogen element.

13. The quantum dot backlight module of claim 8, wherein the quantum dot backlight module further comprises a module frame, an optical component and a light source within the module frame; the optical component comprising a diffusion sheet, a prism sheet, the quantum dot enhancement film, a light guide sheet and a reflection sheet, arranged from top to bottom.

14. A display device comprising a quantum dot backlight module comprising a quantum dot enhancement film, and the quantum dot enhancement film comprises:
   an optical film; and
   a perovskite quantum sphere molecule coated on the optical film, including a nano-scale sphere doped with a perovskite quantum dot, with the perovskite quantum dot combined through a chemical bond and doped on a surface of the nano-scale sphere.

15. The display device of claim 14, wherein a composition of the nano-scale sphere comprises at least one of $SiO_2$, $TiO_2$, and an organic light emitting material.

16. The display device of claim 14, wherein the perovskite quantum dot comprises at least one of an organic and inorganic hybrid perovskite quantum dot or, and a fully inorganic perovskite quantum dot.

17. The display device according to claim 16, wherein the organic and inorganic hybrid perovskite quantum dots comprises a chemical formula of $RNH_3MX_3$, $RNH_3^+$ is an aliphatic linear cation and M is a metal element of Group IV, and X is a halogen element.

18. The display device of claim 16, wherein the fully inorganic perovskite quantum dot comprises a chemical formula of $CsMX_3$, M is a metal element of Group IV and X is a halogen element.

19. The display device of claim 14, wherein the quantum dot backlight module further comprises a module frame, an optical component and a light source within the module frame; the optical component comprising a diffusion sheet, a prism sheet, the quantum dot enhancement film, a light guide sheet and a reflection sheet, arranged from top to bottom.

\* \* \* \* \*